United States Patent
Jung et al.

(10) Patent No.: US 12,529,117 B2
(45) Date of Patent: Jan. 20, 2026

(54) WIRE ROD AND COMPONENT, FOR COLD FORGING, EACH HAVING EXCELLENT DELAYED FRACTURE RESISTANCE CHARACTERISTICS, AND MANUFACTURING METHODS THEREFOR

(71) Applicant: POSCO, Pohang-si (KR)

(72) Inventors: Byung-in Jung, Gyeongsangbuk-do (KR); Yong-sik Park, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 572 days.

(21) Appl. No.: 17/784,458

(22) PCT Filed: Nov. 9, 2020

(86) PCT No.: PCT/KR2020/015596
§ 371 (c)(1),
(2) Date: Jun. 10, 2022

(87) PCT Pub. No.: WO2021/125555
PCT Pub. Date: Jun. 24, 2021

(65) Prior Publication Data
US 2023/0020467 A1    Jan. 19, 2023

(30) Foreign Application Priority Data

Dec. 18, 2019 (KR) .................. 10-2019-0169862

(51) Int. Cl.
*C21D 8/06* (2006.01)
*C21D 6/00* (2006.01)
(Continued)

(52) U.S. Cl.
CPC ............. *C21D 8/065* (2013.01); *C21D 6/002* (2013.01); *C21D 6/005* (2013.01); *C21D 6/008* (2013.01);
(Continued)

(58) Field of Classification Search
CPC ......... C22C 38/22; C22C 38/24; C22C 38/02; C22C 38/04; C21D 9/525; C21D 9/0093;
(Continued)

(56) References Cited

U.S. PATENT DOCUMENTS

| 2012/0211131 A1 | 8/2012 | Altschuler et al. |
| 2016/0060721 A1* | 3/2016 | Nagao ................... C22C 38/005 148/330 |
| 2023/0029137 A1* | 1/2023 | Jung ....................... C21D 1/25 |

FOREIGN PATENT DOCUMENTS

| CN | 103614634 A | 3/2014 |
| CN | 104046903 A | 9/2014 |

(Continued)

OTHER PUBLICATIONS

NPL: online translation of JP-2006219718-A, Aug. 2006 (Year: 2006).*

(Continued)

*Primary Examiner* — Jie Yang
(74) *Attorney, Agent, or Firm* — MORGAN, LEWIS & BOCKIUS LLP

(57) ABSTRACT

Disclosed are a wire rod and a component, for cold forging, each having excellent delayed fracture resistance characteristics and applicable to high-strength bolts and the like and a manufacturing method therefor.

According to an embodiment, a heat-treated component having excellent delayed fracture resistance characteristics includes, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, includes, as a microstructure, a tempered (Continued)

martensite phase in an area fraction of 95% or more, and includes V-based carbides having a diameter of 300 nm or less at $10/100$ $\mu m^2$ or more.

6 Claims, 1 Drawing Sheet

(51) Int. Cl.
*C21D 7/02* (2006.01)
*C21D 9/52* (2006.01)
*C22C 38/02* (2006.01)
*C22C 38/04* (2006.01)
*C22C 38/22* (2006.01)
*C22C 38/24* (2006.01)

(52) U.S. Cl.
CPC ............... *C21D 7/02* (2013.01); *C21D 9/525* (2013.01); *C22C 38/02* (2013.01); *C22C 38/04* (2013.01); *C22C 38/22* (2013.01); *C22C 38/24* (2013.01); *C21D 2211/001* (2013.01); *C21D 2211/002* (2013.01); *C21D 2211/008* (2013.01); *C21D 2211/009* (2013.01)

(58) Field of Classification Search
CPC ... C21D 7/02; C21D 7/10; C21D 1/18; C21D 1/22; C21D 2211/008; C21D 6/02

See application file for complete search history.

(56) References Cited

FOREIGN PATENT DOCUMENTS

| | | | |
|---|---|---|---|
| CN | 106086652 | A | 11/2016 |
| CN | 107794441 | A | 3/2018 |
| JP | H06-306543 | A | 11/1994 |
| JP | H07-126799 | A | 5/1995 |
| JP | 2001-288538 | A | 10/2001 |
| JP | 2006219718 | A * | 8/2006 |
| JP | 2018-003051 | A | 1/2018 |
| KR | 10-2004-0006248 | A | 1/2004 |
| KR | 10-0723186 | B1 | 5/2007 |
| KR | 2009-0071164 | A | 7/2009 |
| KR | 10-2016-0066570 | A | 6/2016 |
| KR | 10-2019-0075378 | A | 7/2019 |
| KR | 10-2117400 | B1 | 6/2020 |

OTHER PUBLICATIONS

Extended European Search Report issued in corresponding European Application No. 20901950.4-1103 dated May 15, 2024.
Supplementary European Search Report issued in corresponding European Application No. 20901950.4-1103 dated Jun. 5, 2024.
International Search Report (with partial English translation) dated Apr. 13, 2021 issued in International Patent Application No. PCT/KR2020/015596.
Office Action dated Sep. 10, 2021, issued in corresponding Korean Patent Application No. 10-2019-0169862.
Office Action dated Apr. 1, 2021, issued in corresponding Korean Patent Application No. 10-2019-0169862.
Chinese Office Action dated Feb. 15, 2023 issued in Chinese Patent Application No. 202080092128.9 (with English translation).

* cited by examiner

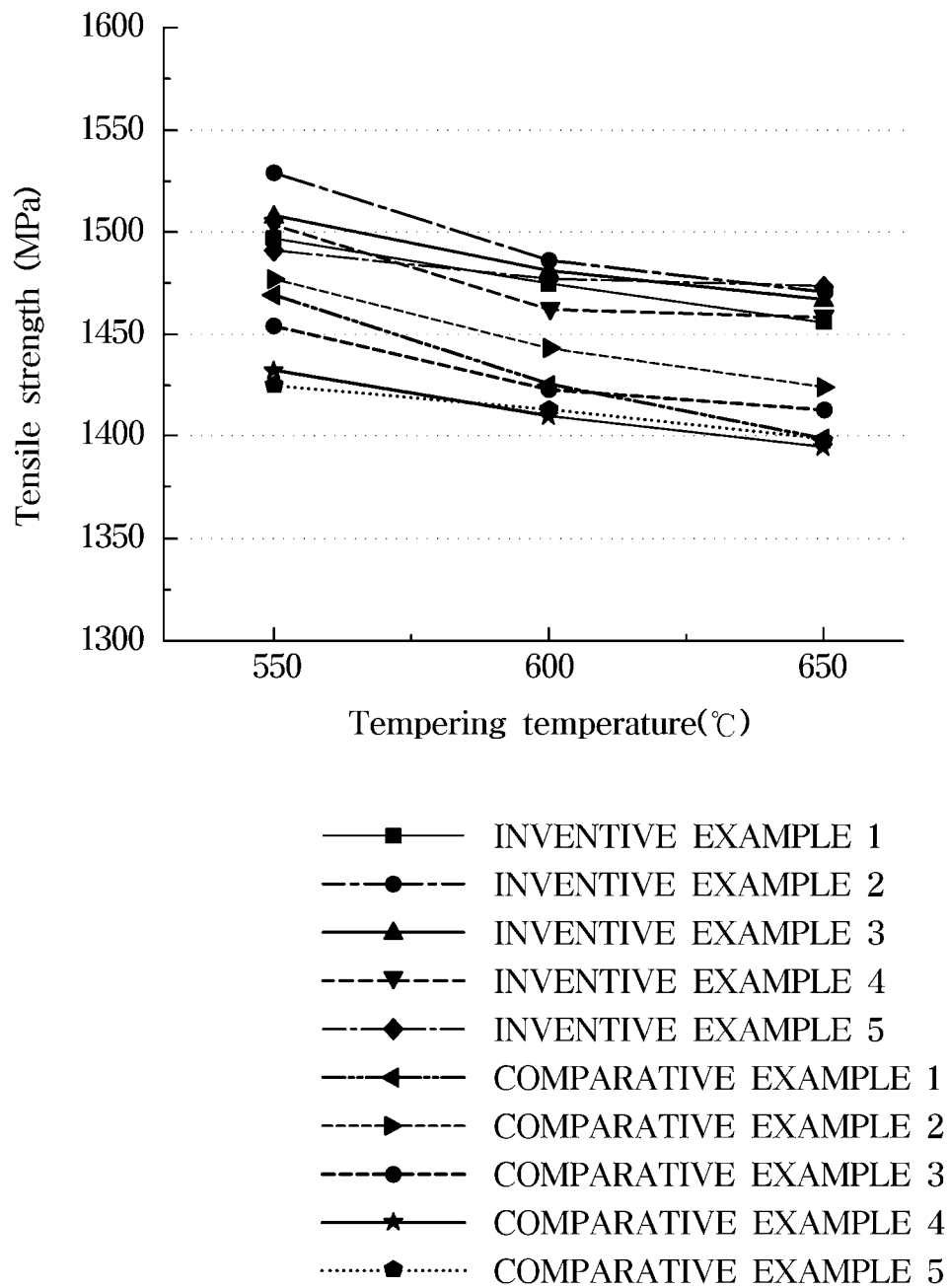

WIRE ROD AND COMPONENT, FOR COLD FORGING, EACH HAVING EXCELLENT DELAYED FRACTURE RESISTANCE CHARACTERISTICS, AND MANUFACTURING METHODS THEREFOR

CROSS-REFERENCE OF RELATED APPLICATIONS

This application is the U.S. National Phase under 35 U.S.C. § 371 of International Patent Application No. PCT/KR2020/015596, filed on Nov. 9, 2020, which in turn claims the benefit of Korean Application No. 10-2019-0169862, filed on Dec. 18, 2019, the entire disclosures of which applications are incorporated by reference herein.

TECHNICAL FIELD

The present disclosure relates to a wire rod and a component, for cold forging, each having excellent delayed fracture resistance characteristics and a manufacturing method therefor, and more particularly, to a wire rod and a component, for cold forging, each having excellent delayed fracture resistance characteristics and applicable to high-strength bolts and the like and a manufacturing method therefor.

BACKGROUND ART

General wire rod products for cold forging are manufactured into mechanical structures and automotive parts by performing cold drawing, spheroidizing heat treatment, cold drawing, cold forging, quenching, and tempering.

Recent trends of technical development of steel materials for cold forging are focused on development of process omission-type wire rods obtained by omitting heat treatment and processing and development of high-strength steel materials for cold forging capable of reducing weights of components in accordance with worldwide fuel efficiency regulations of automobiles. However, such high-strength components for cold forging should undergo quenching and tempering heat treatment after cold forging, and a tempered martensite structure, as a microstructure formed thereby, is extremely sensitive to hydrogen delayed fracture at a high strength of 1300 MPa or more and thus it is difficult to use the same.

Meanwhile, strength and toughness are generally incompatible with each other, and a phenomenon in which toughness deteriorates as strength is improved is observed. Therefore, there is a need to develop a component having excellent delayed fracture resistance characteristics by obtaining strength and hydrogen delayed fracture resistance.

DISCLOSURE

Technical Problem

To solve the above-described problems, provided are a wire rod and a component, for cold forging, each having excellent delayed fracture resistance characteristics and a manufacturing method therefor.

Technical Solution

In accordance with an aspect of the present disclosure to achieve the above-described objects, a heat-treated component having excellent delayed fracture resistance characteristics includes, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, includes, as a microstructure, a tempered martensite phase in an area fraction of 95% or more, and includes a V-based carbide having a diameter of 300 nm or less at 10/100 $\mu m^2$ or more.

In addition, in each heat-treated component having excellent delayed fracture resistance characteristics according to the present disclosure, Expression (1) below may be satisfied.

$$Cr+2.7Mo+6V \geq 3.56 \tag{1}$$

Here, Cr, Mo, and V denote wt % of the respective elements.

In addition, in each heat-treated component having excellent delayed fracture resistance characteristics according to the present disclosure, an aspect ratio of the V-based carbide may be from 10 to 1:1.

In addition, the heat-treated component having excellent delayed fracture resistance characteristics according to the present disclosure may further include Mo-based carbides having a diameter of 500 nm or less at 20/100 $\mu m^2$ or more as a microstructure.

In addition, the heat-treated component having excellent delayed fracture resistance characteristics may further include Cr-based carbides having a diameter of 200 nm or less at 20/100 $\mu m^2$ or more as a microstructure.

In addition, in each heat-treated component having excellent delayed fracture resistance characteristics, an average grain diameter of spherical austenite may be 10 $\mu m$ or less.

In addition, in each heat-treated component having excellent delayed fracture resistance characteristics, a tensile strength may be 1450 MPa or more.

In addition, in each heat-treated component having excellent delayed fracture resistance characteristics, an impact toughness may be 80 J or more.

Also, in accordance with another aspect of the present disclosure to achieve the above-described objects, a method for manufacturing a heat-treated component having excellent delayed fracture resistance characteristics includes a performing, at least once, spheroidizing heat treatment and drawing a wire rod including, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, and satisfying Expression (1) below, to prepare a steel wire, cold forging the steel wire to prepare a component, heating the component, quenching the heated component, reheating the quenched component to 850 to 950° C., requenching the reheated component, and tempering the requenched component, wherein the reheated component includes, as a microstructure, a V-based carbide having a diameter of 300 nm or less at 10/100 $\mu m^2$ or more.

$$Cr+2.7Mo+6V \geq 3.56 \tag{1}$$

Here, Cr, Mo, and V denote wt % of the respective elements.

Also, in accordance with another aspect of the present disclosure to achieve the above-described objects, a wire rod for cold forging includes, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, wherein a microstructure includes, in an area fraction, 85% or more or bainite, 2 to 10% of martensite, and 1 to 5% of pearlite.

In addition, in each wire rod for cold forging according to the present disclosure, Expression (1) below may be satisfied.

$$Cr+2.7Mo+6V \geq 3.56 \quad (1)$$

Here, Cr, Mo, and V denote wt % of the respective elements.

In addition, in each wire rod for cold forging according to the present disclosure, an average grain diameter of spherical austenite may be 30 μm or less.

Advantageous Effects

According to embodiments of the present disclosure, the heat-treated component may have excellent hydrogen delayed fracture resistance after quenching and tempering heat treatment by minimizing the content of Si, which causes solid solution strengthening to deteriorate cold forgeability, by adding Mo to prevent a decrease in strength, by adding V to enhance the strength and grain refinement.

According to an embodiment of the present disclosure, by quenching the component including fine grains of spherical austenite and tempering the component at a high temperature of 500° C. or higher, formation of carbides in the form of a thin film may be prevented in grain boundaries of spherical austenite and spherical carbides may be dispersedly distributed in and out of the grain boundaries. Therefore, hydrogen delayed fracture resistance of heat-treated component may be improved.

DESCRIPTION OF DRAWINGS

FIG. 1 is a graph showing tensile strengths of inventive examples and comparative examples, respectively.

BEST MODE

A heat-treated component having excellent delayed fracture resistance characteristics according to an embodiment of the present disclosure includes, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, includes, as a microstructure, a tempered martensite phase in an area fraction of 95% or more, and includes V-based carbides having a diameter of 300 nm or less at 10/100 μm² or more.

MODES OF THE INVENTION

Hereinafter, preferred embodiments of the present disclosure will now be described. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as "including" or "having" are intended to indicate the existence of features, steps, functions, components, or combinations thereof disclosed in the specification, and are not intended to preclude the possibility that one or more other features, steps, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms "about", "substantially", etc. used throughout the specification mean that when a natural manufacturing and substance allowable error are suggested, such an allowable error corresponds a value or is similar to the value, and such values are intended for the sake of clear understanding of the present invention or to prevent an unconscious infringer from illegally using the disclosure of the present invention.

A wire rod for cold forging according to the present disclosure includes, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities.

Hereinafter, reasons for numerical limitations on the contents of alloy components in the embodiment of the present disclosure will be described. Hereinafter, the unit is wt % unless otherwise stated.

Carbon (C): 0.3 to 0.5 wt %.

C is an element added to obtain strength of products. When the C content is less than 0.3%, it is difficult to obtain desired strength and it is not easy to obtain sufficient quenchability after final quenching/tempering (Q/T) heat treatment. On the contrary, when the C content exceeds 0.5%, carbides are excessively formed, causing a problem of a decrease in a fatigue life. Therefore, an upper limit of the C content is controlled to 0.5%.

Silicon (Si): 0.01 to 0.3 wt %

Si is an element used for deoxidization of a steel and also advantageous to obtain strength by solid solution strengthening. In the present disclosure, Si is added in an amount of 0.01% or more for deoxidization and to obtain strength. However, an excess of Si may deteriorate cold forgeability, causing a problem of difficulty in processing a component having a complex shape such as a bolt. Therefore, an upper limit of the Si content is controlled to 0.3% in the present disclosure.

Manganese (Mn): 0.3 to 1.0 wt %

Mn is advantageous to enhance quenchability of a component to obtain strength, as an element increasing rollability and decreasing embrittlement. Therefore, Mn is added in an amount of 0.3% or more to obtain sufficient strength. However, when the Mn content is excessive, a hard structure may be easily formed during cooling after hot rolling, and MnS inclusions are formed in a large quantity, resulting in deterioration of fatigue properties. Therefore, an upper limit of the Mn content is controlled to 1.0% in the present disclosure.

Chromium (Cr): 0.3 to 1.5 wt %

Cr is an element enhancing oxidation resistance and quenchability. When the Cr content is less than 0.3%, it is difficult to obtain sufficient oxidation resistance and quenchability, failing to obtain sufficient strength after Q/T heat treatment. On the contrary, an excess of Cr may excessively enhance quenchability to cause distortion of the component after quenching, and thus an additional process is required to correct the distortion. Also, problems of a decrease in impact toughness and coarsening of carbides with poor hydrogen delayed fracture resistance may be caused. Therefore, an upper limit of the Cr content is controlled to 1.5% in the present disclosure.

Molybdenum (Mo): 0.3 to 1.5 wt %

Mo is an element enhancing quenchability by precipitation strengthening effect due to precipitation of fine carbides and sold-solution strengthening effect. Enhancement of quenchability by Mo is more effective than that by Mn and Cr. When the Mo content is less than 0.3%, quenching is not sufficiently performed, failing to obtain sufficient strength after Q/T heat treatment. On the contrary, an excess of Mo excessively enhances quenchability causing distortion of a component after quenching, and thus an additional process is required to correct the distortion. Therefore, an upper limit of the Mo content is controlled to 1.5% in the present disclosure.

Vanadium (V): 0.01 to 0.4 wt %

V is an element refining a structure of a steel by forming fine carbonitrides such as VC, VN, and V(C, N). When the V content is less than 0.01%, grain boundaries of spherical austenite cannot be fixed due to low distribution of V precipitate in a base material, and thus the grains of spherical austenite coarsen during a process of reheating a quenched component, causing a problem of a decrease in strength. However, when the V content is excessive, coarse carbonitrides are formed, causing a problem of deterioration of impact toughness. Therefore, an upper limit of the V content is controlled to 0.4% in the present disclosure.

In the present disclosure, at least two of the alloying elements Cr, Mo, and V described above may be included, preferably, all of the alloying elements may be included in consideration of quenchability, impact toughness, and the like.

The remaining component of the composition of the present disclosure is iron (Fe). However, the composition may include unintended impurities inevitably incorporated from raw materials or surrounding environments, and thus addition of other alloy components is not excluded. The impurities are not specifically mentioned in the present disclosure, as they are known to any person skilled in the art of manufacturing.

The present inventors have found that strength and delayed fracture resistance of a steel material for cold forging may further be enhanced in the case where the relationship of the contents of Cr, Mo, and V satisfies a particular condition and derived the following expression of allying elements. A wire rod for cold forging according to an embodiment of the present disclosure may satisfy the above-described composition of alloying elements and Expression (1) below.

$$Cr+2.7Mo+6V \geq 3.56 \qquad (1)$$

In Expression (1), Cr, Mo, and V denote wt % of the respective elements. Also, 0 is substituted for an alloying element not included therein among Cr, Mo, and V.

In order to enhance hydrogen delayed fracture resistance, fine carbides capable of trapping diffusible hydrogen should be obtained. CrC, MoC, and VC carbides respectively including Cr, Mo, and V, as main elements, are fine carbides capable of trapping hydrogen. When the number of such carbides is over a certain level, a strength of 1450 MPa or higher may be obtained at a tempering temperature of 550 to 650° C. and the hydrogen trapping effects may be maximized. In consideration thereof, strength and hydrogen delayed fracture resistance of a heat-treated component may be enhanced at a high tempering temperature of 550 to 650° C. by adjusting the composition of alloying elements to satisfy Expression (1) above.

The microstructure of the wire rod for cold forging according to an embodiment of the present disclosure may include, in an area fraction, 85% or more of bainite, 2 to 10% of martensite, and 1 to 5% of pearlite.

In addition, in the wire rod for cold forging according to an embodiment of the present disclosure, an average grain diameter of spherical austenite may be 30 μm or less. In this regard, the average grain diameter of spherical austenite in the wire rod refers to an average grain diameter of an austenite structure of the wire rod after coiling and before cooling.

First, a method for manufacturing a wire rod for cold forging according to the present disclosure will be described.

The method for manufacturing a wire rod for cold forging according to an embodiment of the present disclosure may include heating a billet satisfying the above-described composition of alloying elements, preparing a wire rod from the heated billet, and cooling the wire rod.

In the step of heating the billet, the billet may satisfy the above described composition of alloying elements and Expression (1), and the heating may be performed at a temperature of 900 to 1200° C.

In the step of preparing the wire rod using the heated billet, the heated billet may be finish rolled and coiled at a temperature of 800 to 1000° C. to a wire rod. In this regard, a rolling ratio may be 80% or more.

In the step of cooling the wire rod, the wire rod may be cooled at a rate of 0.2 to 0.5° C./s, and a cooling method is not particularly limited, but an air-cooling-type method may be used. The microstructure of the cooled wire rod may include, in an area fraction, 85% or more of bainite, 2 to 10% of martensite, and 1 to 5% of pearlite, and an average grain diameter of spherical austenite may be 30 μm or less. In this regard, the average grain diameter of spherical austenite of the wire rod refers to an average grain diameter of an austenite structure of wire rod after coiling and before cooling.

Hereinafter, a method for manufacturing a heat-treated component having excellent delayed fracture resistance characteristics using the above-described wire rod for cold forging will be described.

According to a method for manufacturing a heat-treated component having excellent delayed fracture resistance characteristics according to an embodiment of the present disclosure, the method may include performing, at least once, spheroidizing heat treatment and drawing on the cooled wire rod after the above-described method for manufacturing a wire rod for cold forging to prepare a steel wire, manufacturing a component by cold forging the steel wire, heating the component, quenching the heated component, reheating the quenched component, requenching the reheated component, and tempering the requenched component. Hereinafter, each of the steps will be described in detail.

According to the above-described manufacturing method, the cooled wire rod may be subjected to spheroidizing heat treatment and drawing, once or more, to prepare a steel wire. The spheroidizing heat treatment may be appropriately performed to provide a processing amount of a steel material before drawing, and the drawing may be appropriately performed in consideration of processing limits of drawing. According to the present disclosure, by performing, at least once, spheroidizing heat treatment and drawing on the wire rod to prepare a steel wire having a small diameter used to manufacture a component having a complex shape.

The steel wire may be cold-forged to manufacture a component. Examples of the component may include screws, bolts, and the like.

Subsequently, the component may be heated. The step of heating the component is a step of completely remelting carbides precipitated while rolling the wire rod. According to an embodiment, the component may be heated at a temperature of 1000 to 1100° C. In this regard, a heating time may be from 1000 to 3000 seconds.

In the step of quenching the heated component, the heated component may be quenched to a temperature of 40 to 80° C. A quenching method is not particularly limited, but the quenching may be performed by immersing the heated component in an oil at a temperature of 40 to 80° C.

The step of reheating the quenched component is a step of controlling an average grain diameter of austenite to 10 μm or less in the reheated component by precipitating fine V-, Mo-, and Cr-based carbides.

The V-based carbides according to an embodiment of the present disclosure may have a diameter of 300 nm or less in the microstructure of the heat-treated component and may be contained in an amount of 10/100 μm² or more. In this case, an aspect ratio of the V-based carbides may be 10 to 1:1.

The Mo-based carbides according to an embodiment of the present disclosure may have a diameter of 500 nm or less in the microstructure of the heat-treated component and may be contained in an amount of 20/100 μm² or more. In this case, an aspect ratio of the Mo-based carbides may be 10 to 1:1.

The Cr-based carbides according to an embodiment of the present disclosure may have a diameter of 200 nm or less in the microstructure of the heat-treated component and may be contained in an amount of 20/100 μm² or more. In this case, an aspect ratio of the Cr-based carbides may be 10 to 1:1.

By controlling the average grain diameter of austenite to be small by fine precipitates of V, Mo, and Cr-based carbides, the heat-treated component may obtain sufficient strength after the subsequent Q/T heat treatment. In addition, by the step of reheating the quenched component, formation of a carbide in the form of a thin film may be prevented in austenite grain boundaries, and spherical carbides may be dispersedly distributed in and out of the grain boundaries, thereby improving hydrogen delayed fracture resistance. According to an embodiment, the reheating may be performed by heating the quenched component to a temperature of 850 to 950° C. In this regard, after increasing the temperature of 850 to 950° C., the component may be maintained in the temperature range for 3000 to 4000 seconds.

In the step of requenching the reheated component, the reheated component may be requenched to a temperature of 40 to 80° C. A quenching method is not particularly limited, but the quenching may be performed by immersing the reheated component in an oil at a temperature of 40 to 80° C.

The step of tempering the requenched component is a step of controlling the final microstructure of the heat-treated component to a tempered martensite. According to an embodiment, the requenched component may be tempered at a high temperature to prevent formation of a carbide in the form of a thin film in grain boundaries of spherical austenite, and spherical carbides may be dispersedly distributed in and out of the grain boundaries. Accordingly, hydrogen delayed fracture resistance of the heat-treated component may be improved.

According to an embodiment, the tempering step may be performed by tempering heat treatment at 550 to 650° C. In this regard, a tempering heat treatment time may be from 3000 to 10000 seconds.

The heat-treated component having excellent delayed fracture resistance characteristics according to the present disclosure manufactured according to the above-described manufacturing method may include, in percent by weight (wt %), 0.3 to 0.5% of C, 0.1 to 0.3% of Si, 0.5 to 1.0% of Mn, at least two types selected from the group consisting of 0.5 to 1.5% of Cr, 0.5 to 1.5% of Mo, and 0.01 to 0.2% of V, and the balance being Fe and other impurities, and include, as a microstructure, 95% or more of a tempered martensite phase in an area fraction.

In addition, according to an embodiment of the present disclosure, the heat-treated component satisfying the composition of alloying elements may satisfy Expression (1) below. The reasons for limitations on Expression (1) are as described above and will be omitted for descriptive convenience.

$$Cr+2.7Mo+6V \geq 3.56 \tag{1}$$

In Expression (1), Cr, Mo, and V denote wt % of the respective elements.

In addition, the heat-treated component having excellent delayed fracture resistance characteristics according to an embodiment of the present disclosure may include, as a microstructure, V-based carbides having a diameter of 300 nm or less at 10/100 μm² or more. In this regard, an aspect ratio of the V-based carbides may be 10 to 1:1.

In addition, the heat-treated component having excellent delayed fracture resistance characteristics according to an embodiment of the present disclosure may include, as a microstructure, Mo-based carbides having a diameter of 500 nm or less at 20/100 μm² or more. In this regard, an aspect ratio of the Mo-based carbides may be 10 to 1:1.

In addition, the heat-treated component having excellent delayed fracture resistance characteristics according to an embodiment of the present disclosure may include, as a microstructure, Cr-based carbides having a diameter of 200 nm or less at 20/100 μm² or more. In this regard, an aspect ratio of the Cr-based carbides may be 10 to 1:1.

In addition, the heat-treated component having excellent delayed fracture resistance characteristics according to an embodiment of the present disclosure may have an average grain diameter of spherical austenite of 10 μm or less. In this regard, the average grain diameter of spherical austenite of the heat-treated component refers to an average grain diameter of the austenite structure of a component after reheating and before requenching.

In addition, the heat-treated component having excellent delayed fracture resistance characteristics according to an embodiment of the present disclosure may have a tensile strength of 1450 MPa or more.

In addition, the heat-treated component having excellent delayed fracture resistance characteristics according to an embodiment of the present disclosure may have an impact toughness of 80 J or more.

Hereinafter, the present disclosure will be described in more detail with reference to the following examples. However, the following examples are merely presented to exemplify the present disclosure, and the scope of the present disclosure is not limited thereto.

EXAMPLES

Billets having the compositions of alloying elements shown in Table 1 were heated to a temperature of 900 to 1200° C., and finish rolled and coiled at a temperature of 800 to 1000° C. to prepare wire rods. The prepared wire rods were cooled at a rate of 0.2 to 0.5° C./s. Upon completion of the cooling, a microstructure of each wire rod included, in an area fraction, 85% or more of bainite, 2 to 10% of martensite, and 1 to 5% of pearlite.

Meanwhile, in Table 1, 'Expression (1)' was derived by substituting contents (wt %) of the respective elements Cr, Mo, and V into the relationship of 'Cr+2.7Mo+6V' disclosed herein.

Each of the cooled wire rods was subjected to spheroidizing heat treatment and drawing to prepare a steel wire and cold-forged to prepare a component. Subsequently, the component was heated at a temperature of 1000 to 1100° C. for 2000 seconds and quenched by immersing the component in an oil at 60° C. Then, the component was reheated to 880° C. and maintained for 3600 seconds, and then requenched by immersing the component in an oil at 60° C. Subsequently, the component was tempered by heat treatment at a high temperature of 550 to 650° C. for 3000 seconds to 10000 seconds, and then tested by a tensile test. As a result of the tensile test, tensile strength and impact toughness are shown in Table 1 below and in FIG. 1.

In this regard, the reheating heat treatment means a process of heat treatment according to the present disclosure proceeding in the order of quenching→reheating→requenching→tempering. On the contrary, the common heat treatment means heat treatment proceeding in the order of quenching→tempering, as a common Q/T process, unlike the heat treatment according to the present disclosure proceeding in the order of quenching→reheating→requenching→tempering.

The results of the tensile test of the cases of applying the common heat treatment and applying the reheating heat treatment are shown in Table 2 below.

TABLE 1

| | Composition of alloying elements (wt %) | | | | | | Expression (1) | Tensile strength (MPa) | Impact toughness (J) |
|---|---|---|---|---|---|---|---|---|---|
| | C | Si | Mn | Cr | Mo | V | | | |
| Inventive Example 1 | 0.38 | 0.13 | 0.52 | 1.22 | 0.64 | 0.12 | 3.668 | 1456 | 83 |
| Inventive Example 2 | 0.47 | 0.25 | 0.89 | 1.02 | 0.85 | 0.05 | 3.615 | 1471 | 85 |
| Inventive Example 3 | 0.42 | 0.22 | 0.73 | 0.83 | 0.82 | 0.09 | 3.584 | 1467 | 86 |
| Inventive Example 4 | 0.43 | 0.27 | 0.91 | 0.98 | 0.54 | 0.19 | 3.578 | 1458 | 83 |
| Inventive Example 5 | 0.32 | 0.23 | 0.52 | 0.57 | 1.47 | 0.15 | 5.439 | 1473 | 97 |
| Comparative Example 1 | 0.39 | 0.12 | 0.54 | 1.01 | 0.65 | 0.11 | 3.425 | 1399 | 77 |
| Comparative Example 2 | 0.46 | 0.26 | 0.87 | 0.93 | 0.86 | 0.03 | 3.432 | 1424 | 82 |
| Comparative Example 3 | 0.42 | 0.23 | 0.71 | 0.87 | 0.72 | 0.09 | 3.354 | 1413 | 78 |
| Comparative Example 4 | 0.42 | 0.25 | 0.83 | 0.96 | 0.55 | 0.15 | 3.345 | 1395 | 84 |
| Comparative Example 5 | 0.33 | 0.24 | 0.53 | 0.53 | 1.08 | 0.01 | 3.506 | 1398 | 91 |

All of the inventive examples satisfied the composition of alloying elements defined by the present disclosure and the values of Expression (1) were 3.56 or more. However, although the comparative examples satisfied the composition of alloying elements defined by the present disclosure, the values of Expression (1) were below 3.56.

Referring to Table 1 and FIG. 1, although all of the inventive examples exhibited a tensile strength of 1450 MPa or more, the tensile strength of the comparative examples was less than 1450 MPa and significant decreases in strength were observed in the comparative examples as tempering temperature increased, failing to obtain sufficient strength.

Meanwhile, for comparison of physical properties between the inventive examples and the comparative examples in the case where a common heat treatment is applied and a reheating heat treatment is applied, the inventive examples and the comparative examples was prepared in both cases of the common heat treatment and the reheating heat treatment. Except for this condition, samples were prepared under the same conditions as shown in Table 1.

TABLE 2

| | Common heat treatment | | Reheating heat treatment | |
|---|---|---|---|---|
| | Tensile strength (MPa) | Impact toughness (J) | Tensile strength (MPa) | Impact toughness (J) |
| Inventive Example 1 | 1390 | 76 | 1456 | 83 |
| Inventive Example 2 | 1422 | 78 | 1471 | 85 |

TABLE 2-continued

| | Common heat treatment | | Reheating heat treatment | |
|---|---|---|---|---|
| | Tensile strength (MPa) | Impact toughness (J) | Tensile strength (MPa) | Impact toughness (J) |
| Inventive Example 3 | 1401 | 82 | 1467 | 86 |
| Inventive Example 4 | 1395 | 68 | 1458 | 83 |
| Inventive Example 5 | 1408 | 95 | 1473 | 97 |
| Comparative Example 1 | 1326 | 73 | 1399 | 77 |
| Comparative Example 2 | 1355 | 70 | 1424 | 82 |
| Comparative Example 3 | 1344 | 75 | 1413 | 78 |

TABLE 2-continued

|  | Common heat treatment | | Reheating heat treatment | |
| --- | --- | --- | --- | --- |
|  | Tensile strength (MPa) | Impact toughness (J) | Tensile strength (MPa) | Impact toughness (J) |
| Comparative Example 4 | 1289 | 76 | 1395 | 84 |
| Comparative Example 5 | 1321 | 89 | 1398 | 91 |

In the inventive examples and comparative examples, tensile strength and impact toughness decreased in the cases to which the common heat treatment was applied, compared with the cases to which the reheating heat treatment was applied. Based thereon, it was confirmed that sufficient strength could not be obtained after quenching and tempering heat treatment because average grain diameter of spherical austenite could not be controlled to be small in the case where the reheating heat treatment according to the present disclosure was not applied, and impact toughness deteriorated because carbides in the form of a thin film were formed in grain boundaries of spherical austenite.

Based on the above-described results, it was confirmed that the heat-treated component had excellent hydrogen delayed fracture resistance after quenching and tempering heat treatment by minimizing the content of Si, which causes solid solution strengthening to deteriorate cold forgeability, by adding Mo to prevent a decrease in strength, by adding V to enhance the strength and grain refinement according to an embodiment of the present disclosure.

According to an embodiment of the present disclosure, by quenching the component including grains of spherical austenite and tempering the component at a high temperature of 500° C. or higher, formation of carbides in the form of a thin film may be prevented in grain boundaries of spherical austenite and spherical carbides may be dispersedly distributed in and out of the grain boundaries. Therefore, hydrogen delayed fracture resistance of the heat-treated component was improved.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

According to the present disclosure, a wire rod and a component, for cold forging, each having excellent delayed fracture resistance characteristics and applicable to mechanical structures and automotive parts and a manufacturing method therefor.

The invention claimed is:

1. A heat-treated component having excellent delayed fracture resistance characteristics comprising, in percent by weight (wt %), 0.3 to 0.5% of C, 0.01 to 0.3% of Si, 0.3 to 1.0% of Mn, 0.3 to 1.5% of Cr, 0.3 to 1.5% of Mo, and 0.01 to 0.4% of V, and the balance being Fe and other impurities,
comprising, as a microstructure, a tempered martensite phase in an area fraction of 95% or more,
comprising a V-based carbide having a diameter of 300 nm or less at 10/100 $\mu m^2$ or more,
further comprising, as a microstructure, a Mo-based carbide having a diameter of 500 nm or less at 20/100 $\mu m^2$ or more,
further comprising, as a microstructure, a Cr-based carbide having a diameter of 200 nm or less at 20/100 $\mu m^2$ or more, and
satisfying Expression (1) below:

$$Cr+2.7Mo+6V \geq 3.56 \quad (1)$$

wherein Cr, Mo, and V denote wt % of the respective elements.

2. The heat-treated component according to claim 1, wherein an aspect ratio of the V-based carbide is 10 to 1:1.

3. The heat-treated component according to claim 1, wherein an average grain diameter of spherical austenite is 10 $\mu m$ or less.

4. The heat-treated component according to claim 1, wherein a tensile strength is 1450 MPa or more.

5. The heat-treated component according to claim 1, wherein an impact toughness is 80 J or more.

6. A method for manufacturing the heat-treated component having excellent delayed fracture resistance characteristics according to claim 1, the method comprising:
preparing a steel wire by performing, at least once, spheroidizing heat treatment and drawing on a wire rod comprising, in percent by weight (wt %), 0.3 to 0.5% of C, 0.01 to 0.3% of Si, 0.3 to 1.0% of Mn, at least two types selected from the group consisting of 0.3 to 1.5% of Cr, 0.3 to 1.5% of Mo, and 0.01 to 0.4% of V, and the balance being Fe and other impurities, and satisfying Expression (1) below;
cold forging the steel wire to prepare a component;
heating the component;
quenching the heated component;
reheating the quenched component to 850 to 950° C.;
requenching the reheated component; and
tempering the requenched component,
wherein the reheated component comprises, as a microstructure, a V-based carbide having a diameter of 300 nm or less at 10/100 $\mu m^2$ or more:

$$Cr+2.7Mo+6V \geq 3.56 \quad (1)$$

(wherein Cr, Mo, and V denote wt % of the respective elements).

* * * * *